US005345607A

United States Patent [19]

Liman et al.

[11] Patent Number: 5,345,607

[45] Date of Patent: Sep. 6, 1994

[54] RDS RADIO RECEIVER WITH PROGRAM TYPE MODE

[75] Inventors: Helmut Liman, Nordstemmen; Wiedhold Warnecke, Hildesheim, both of Fed. Rep. of Germany

[73] Assignee: Blaupunkt-Werke GmbH, Hildesheim, Fed. Rep. of Germany

[21] Appl. No.: 822,305

[22] Filed: Jan. 17, 1992

[30] Foreign Application Priority Data

Feb. 8, 1991 [DE] Fed. Rep. of Germany ....... 4103779

[51] Int. Cl.[5] .............................................. H04B 1/16

[52] U.S. Cl. .............................. 455/186.1; 455/158.1; 455/345

[58] Field of Search ............... 455/152.1, 158.1, 158.4, 455/158.5, 160.1, 175.1, 185.1, 186.1, 186.2, 200.1, 345

[56] References Cited

U.S. PATENT DOCUMENTS

| | | | |
|---|---|---|---|
| 4,392,247 | 7/1983 | Van Deursen | 455/161 |
| 4,641,367 | 2/1987 | Van Deursen et al. | 455/186.1 |

FOREIGN PATENT DOCUMENTS

| | | | |
|---|---|---|---|
| 3835870 | 1/1990 | Fed. Rep. of Germany | 455/186.1 |
| 0136829 | 6/1988 | Japan | 455/186.1 |
| 0062921 | 3/1989 | Japan | 455/186.1 |
| 2166822 | 6/1990 | Japan | 455/186.2 |

*Primary Examiner*—Reinhard J. Eisenzopf
*Assistant Examiner*—Chi Phan
*Attorney, Agent, or Firm*—Frishauf, Holtz, Goodman & Woodward

[57] ABSTRACT

A program type PTY mode is integrated into an RDS radio receiver with a limited access surface by means of a mode switch in that the function of the station keys is changed to that of program type keys and that by way of a multiple actuation of the keys it is possible to call up sequentially different program chains having the same type of program at that moment.

6 Claims, 1 Drawing Sheet

RDS RADIO RECEIVER WITH PROGRAM TYPE MODE

Cross-Reference to related patents and applications, assigned to Blaupunkt Werke GmbH or its parent Robert Bosch GmbH, the disclosures of which are hereby incorporated by reference:

- U.S. Pat. No. 3,949,401, HEGELER et al., issued Apr. 6, 1976;
- U.S. Pat. No. 4,435,843, EILERS & BRAGAS, issued Mar. 1984;
- U.S. Pat. No. 4,450,589, EILERS & BRAGAS, issued May 1984;
- U.S. Pat. No. 4,499,603, EILERS, issued Feb. 1985;
- U.S. Pat. No. 4,862,513, BRAGAS, issued Aug. 29, 1989, entitled RADIO RECEIVER WITH TWO DIFFERENT TRAFFIC INFORMATION DECODERS;
- U.S. Ser. No. 447,578, DUCKECK, filed Dec. 7, 1989, COMPUTATION-CONSERVING TRAFFIC DATA TRANSMISSION METHOD & APPARATUS now U.S. Pat. No. 5,181,208;
- U.S. Ser. No. 447,165, BRAGAS & DUCKECK, filed Dec. 7, 1989, DIGITAL TRAFFIC NEWS EVALUATION METHOD, now U.S. Pat. No. 5,065,452, issued Nov. 12, 1991;
- U.S. Ser. No. 447,378, DUCKECK, filed Dec. 7, 1989, ENERGY-CONSERVING STAND-BY FUNCTION IN RADIO TRAFFIC REPORT RECEIVER now U.S. Pat. No. 5,101,510;
- U.S. Ser. No. 459,144, MARDUS, filed Dec. 29, 1989, based on German pending application P 37 24 516.3 now U.S. Pat. No. 5,095,532;
- U.S. Ser. No. 459,147, DUCKECK & BRAGAS, filed Dec. 29, 1989, based on German pending application P 38 10 177.7 now U.S. Pat. No. 5,020,143, May 28, 1991;
- U.S. Ser. No. 459,141, MARDUS, DUCKECK & BRAGAS, filed Dec. 29, 1989, based on German pending application P 38 10 179.3 now U.S. Pat. No. 5,193,214;
- U.S. Ser. No. 775,939, DUCKECK & BRAGAS, filed Oct. 28, 1991, based on German pending application P 39 14 104.7+PCT/DE90/00250;
- U.S. Pat. No. 4,888,699, KNOLL et al., issued Dec. 19, 1989; filed Dec. 18, 1989;
- U.S. Ser. No. 07/810,866, KNOLL et al., filed Dec. 20, 1991;
- U.S. Ser. No. 07/671,261, ATTIG et al., filed Mar. 18, 1991, now U.S. Pat. No. 5,247,70 ;
- U.S. Ser. No. 07/676,895, ALTMANN & EILERS, filed Mar. 28, 1991, now U.S. Pat. No. 5,191,312;
- U.S. Ser. No. 07/744,296, KASSER, filed Aug. 13, 1991, now U.S. Pat. No. 5,222,252;
- U.S. Ser. No. 07/818,058, HEGELER & KASSER, filed Jan. 8, 1992, now U.S. Pat. No. 5,278,560.

FIELD OF THE INVENTION

The invention relates generally to RDS radio receiver, in accordance with the aforementioned EBU Technical Specification, and, in particular, to a car radio receiver.

BACKGROUND

Identifications of program types are provided in the radio data system, defined in the beginning of 1984 and in the meantime established between radio stations and appropriately equipped radio receivers. RDS data transmission include 104 bit long "groups" of 26-bit "blocks", which reserve several bits in block 2 for a Program TYpe or PTY code. Item 4.3 of the system definition states that the identification makes it possible to program receivers in such a way that they only react to those programs which correspond to the desired type, i.e. reproduce only these via the loudspeaker. See page 30.

As a rule, there is only limited space with a narrow access surface available for installing car radios in motor vehicles. Following installation of the car radio, this access surface is covered by the instrument cover. However, the surface of this instrument cover has only sufficient space for a small number of operating elements. For this reason it is known to assign to either individual or all operating elements different switching functions regarding the various modes, in the form of a so-called mode switch, and to indicate the respectively switched-on mode on the display of the car radio.

The actuation of one of the operating elements during the active state in a certain mode is stored in the memories associated with the modes. Subsequently another mode can be selected by means of the mode switch without the previously set selection of the operating element being lost. To change the operation in the mode which was first selected, it is necessary to recall this first-selected mode by means of the mode switch.

THE INVENTION

It is an object of the invention to integrate a specific program type mode (PTY mode) into an existing car radio and to assign the required switching functions to the existing operating elements in a sensible manner for simplified operation of the apparatus in the PTY mode.

DRAWING

FIG. 1 is a block diagram of the switching stages in accordance with the invention.

DETAILED DESCRIPTION

Figure 1:
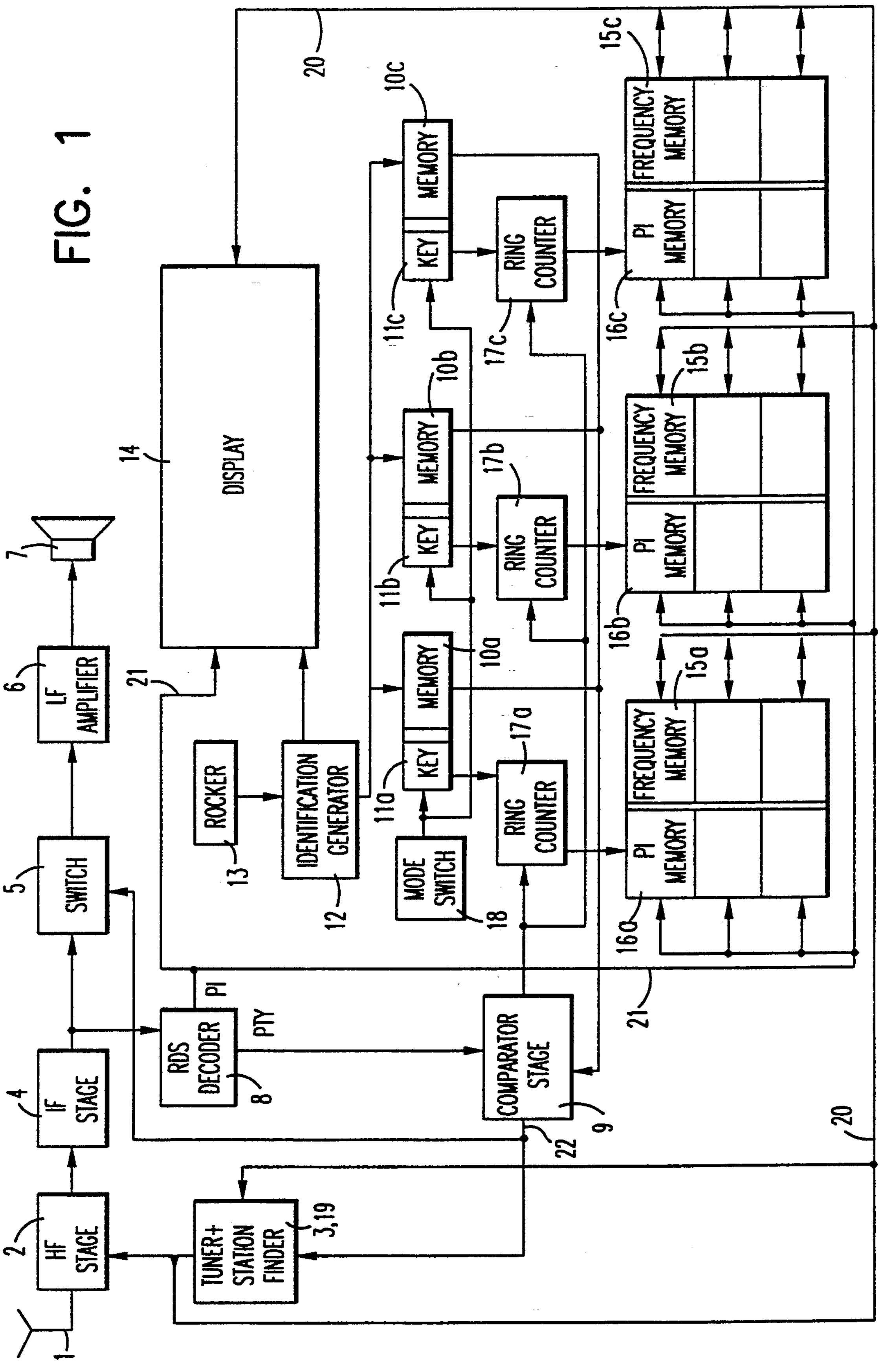

The block diagram illustrates the switching stages recited below, which are of importance for the invention. A High Frequency (HF) stage 2 is coupled to an antenna 1 and the receiver's tuning unit 3 comprises station keys 11 and an automatic station finder 19. The HF stage is connected with an IF (Intermediate Frequency) stage 4, from which the audio frequency or Low Frequency (LF) signal can be picked up, which is supplied to an LF amplifier 6 via a controlled switch 5 and is reproduced by means of a loudspeaker 7.

An RDS decoder 8 is connected upstream of the switch 5 which, among others, has outputs for the program type identification PTY contained in the RDS signal and for the program identification code PI. The PTY output is connected with a comparator stage 9, the control output 22 of which is connected to the automatic station finder 19. The output 22 of the comparator stage 9 simultaneously controls the switch 5.

The second input of the comparator stage 9 is connected with respective outputs of memories 10*a*, 10*b*, . . . which in the program type PTY mode are assigned to the station keys 11*a*, 11*b*, . . . One program type PTY identification can be read into each of the memories 10. For this purpose, the memories 10 are connected with the output of an identification generator 12, which is controlled by a rocker 13. The program type identification called up via the rocker 13 is shown on the display 14. For indicating the frequency selected, this display is also connected by a bus 20 to the tuning unit 3.

Frequency memories 15 and program identification memories (PI memories) 16 are assigned to each station key 11 and are respectively connected via bidirectional bus 20 with the automatic station finder 19 and to aline 21 from the PI output of the RDS decoder 8. FIG. 1 shows a plurality of memory locations, arranged vertically.

In addition, a respective ring counter 17 counter 17*a*, 17*b*, 17*c* is assigned to each station key 11*a*, 11*b*, 11*c* and counts the number of key operations and sequentially calls up the PI memories. The comparator stage 9 has an output is also connected to the counting inputs of the ring counters. A circuit organized in this way is used for achieving the object which is the basis of the invention in the following manner:

The accomplishment of the object was based on the observation that a particular user of a car radio does not have the same interest in all programs offered. Thus it is not necessary to be able to access all 31 types of programs available in the RDS system in the same way and in a simple manner. For this reason the station keys were designed for the rapid selection of the preferred type of program.

In the PTY mode selected by means of a mode switch 18, a respective memory 10 is connected with each station key 11, in which memory one of the PTY identifications can be stored. By means of the rocker switch 13, with which in the normal broadcast mode the next following station would be selected, a PTY identification generator 12 is switched from identification to identification in the PTY mode. If one of the preferred identifications is reached and if, within a preset amount of time after actuation of the rocker switch 13, that station key 11 is pressed, by means of which it is later intended to call up the preferred type of program, the identification reached is stored in the station key memory 10.

With actuation of the station key at a later time, a station search in the FM range is triggered with the aid of the automatic station finder 19, in the course of which the first transmitter is selected which at that time transmits the stored type of program. Its frequency can be stored in the frequency memory 15. It is simultaneously sent via bus 20 and shown in the display. It is possible by means of renewed actuation of the station key to select the second transmitter which transmits the desired type of program.

If different identifications are stored in other station keys it is possible at the start of each station search, regardless of the station key used, to actuate always the frequency memories of the other station keys, which now represent program keys.

Memorization of the various transmitter frequencies transmitting the same type of program is of particular advantage if these transmitter are associated with different program chains. In the radio data system a definite PI code is assigned to each program chain. If, in the course of the station search, transmitters with the same type of program PTY, but belonging to different transmitter chains PI, are detected, it is practical to store also the PI codes assigned to the transmitter frequencies and to arrange these frequencies in the memory in accordance with the PI code. It is then possible to call up the transmitter chains sequentially by repeated sequential actuation of the station/program-type key. The number of actuations is in this case counted by a ring counter 17 connected with the station-program key 11 and another PI code is called up at each ring counter position.

If a driver listens for an extended time to a particular type of program, it is possible that, in the meantime, one of the stored transmitters has changed its type of program. If in the course of selection the program key, under which these transmitters had been stored up to then, is actuated and if the comparator stage determines that, if this transmitter is received, the program type information is no longer correct, the comparator stage 9 automatically increments the ring counter 17 to the next position, i.e. to a transmitter of a different transmitter chain which possibly still transmits the desired type of program. If the desired program cannot be received from any of the stored transmitters, a fresh station search across the entire frequency range is triggered, in the course of which the frequency memories are actuated.

Various changes and modifications may be made, and features described in connection with any one of the embodiments may be used with any of the others, within the scope of the inventive concept.

We claim:

1. A Radio Data System (RDS) receiver having
- a tuning and station finding stage (3, 19);
- a high-frequency (HF) stage (2), controlled by said tuning stage and adapted for connection to an antenna (1);
- an intermediate frequency (IF) stage (4) connected to an output of said high-frequency stage (2);
- an RDS decoder (8) having an input, connected to the output of said IF stage (4) and a pair of outputs furnishing, respectively, a Program Identification (PI) output signal and a Program TYpe (PTY) output signal;
- a display (14) connected to said outputs of said RDS decoder;
- a plurality of station keys (11*a*, 11*b*, 11*c*) and a respective key memory (10*a*, 10*b*, 10*c*) associated with each key;
- a comparator stage (9) having inputs connected respectively to the PTY output of the RDS decoder (8) and to outputs of said key memories (10*a*, 10*b*, 10*c*) in order to determine whether a match exists between said PTY output signal and any key memory output, and having a control output (22) connected to an input of said tuning and station finding stage (3, 19);

wherein, in accordance with the invention,
- a mode switch (18), having an output connected to said station keys (11) and their associated memories (10), is provided for transforming function of said station keys among a plurality of different modes, including a PTY mode;
- a rocker switch (13), having an output connected to said station key memories, is provided for stepping among selections within a particular one of said different modes;
- an identification generator (12), having an input connected to said output of said rocker switch and an output connected to an input of said display (14), is provided for displaying a current selection, made via said rocker switch;
- and, whenever, said PTY mode is selected via said mode switch (18), pressing one of said station keys (11) within a present amount of time after actuation of the rocker switch (13) causes storage of said current selection in the station key memory (10) associated with the station key which was pressed.

2. The RDS receiver of claim 1, further comprising a respective ring counter (17*a*, 17*b*, 17*c*) connected to an output of each of said keys (11*a*, 11*b*, 11*c*) and to an output of said comparator stage (9); and a respective Program Identification (PI) memory (16*a*, 16*b*, 16*c*) and an associated frequency memory (15*a*, 15*b*, 15*c*) associated with each of said station keys (11*a*, 11*b*, 11*c*), and connected thereto through said respective ring counter.

3. The RDS receiver of claim 2, wherein said Program Identification (PI) memories (16*a*, 16*b*, 16*c*) have inputs connected to receive said PI output signal from said RDS decoder (8) and said frequency memories (15*a*, 15*b*, 15*c*) are bidirectionally coupled to said tuning and station finding stage (3, 19).

4. The RDS receiver of claim 3, wherein each Program Identification (PI) memory (16) and associated frequency memory (15) have a plurality of memory locations; and repeated pressing of a station key (11) increments the ring counter (17) connected to the output of the station key (11) pressed, the output signal of the incremented ring counter steps among said plurality of memory locations in the PI and frequency memories (16, 15) connected to the output of the incremented ring counter (17), thereby selecting a new location therein, and causes (20) said tuning and station finding stage (3, 19) to tune to any frequency stored in a currently selected memory location.

5. The RDS receiver of claim 4, wherein said plurality of memory locations is adapted for storage of data identifying respective transmitters of a chain or network which broadcasts a common program.

6. The RDS receiver of claim 4, wherein said plurality of memory locations is adapted for storage of data identifying respective transmitters which have a common Program Identification (PI) code but which are associated with different chains or networks.

* * * * *